US010162116B2

(12) United States Patent
Panotopoulos et al.

(10) Patent No.: US 10,162,116 B2
(45) Date of Patent: Dec. 25, 2018

(54) OPTICAL SLAB

(75) Inventors: Georgios Panotopoulos, Berkeley, CA (US); Michael Renne Ty Tan, Menlo Park, CA (US); Wayne Victor Sorin, Mountain View, CA (US); David A. Fattal, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 745 days.

(21) Appl. No.: 14/373,400

(22) PCT Filed: Apr. 26, 2012

(86) PCT No.: PCT/US2012/035157
§ 371 (c)(1),
(2), (4) Date: Jul. 21, 2014

(87) PCT Pub. No.: WO2013/162567
PCT Pub. Date: Oct. 31, 2013

(65) Prior Publication Data
US 2014/0363165 A1    Dec. 11, 2014

(51) Int. Cl.
*G02B 6/293* (2006.01)
*G02B 6/12* (2006.01)
(Continued)

(52) U.S. Cl.
CPC ..... *G02B 6/29367* (2013.01); *G02B 6/12004* (2013.01); *G02B 6/2938* (2013.01);
(Continued)

(58) Field of Classification Search
CPC . G02B 6/124; G02B 6/13; G02B 6/14; G02B 6/29311; G02B 6/42; G02B 6/4214;
(Continued)

(56) References Cited

U.S. PATENT DOCUMENTS 5,343,542 A     8/1994  Kash et al.
5,345,524 A *   9/1994  Lebby .................... G02B 6/138
                                                   385/88

(Continued)

FOREIGN PATENT DOCUMENTS

KR         101001277 B1    12/2010
WO         WO-02075999 A2   9/2002
WO         WO-2007112548 A1 10/2007

OTHER PUBLICATIONS

PCT Search Report and Written Opinion, dated Dec. 14, 2012, PCT Patent Application No. PCT/US2012/035157, 9 pages.
(Continued)

*Primary Examiner* — Michael Mooney
(74) *Attorney, Agent, or Firm* — Tarolli, Sundheim, Covell & Tummino L.L.P.

(57) ABSTRACT

An apparatus can comprise an optical slab comprising a rigid substrate of substantially transmissive material. The apparatus can also comprise a WDM multiplexer to receive and combine a plurality of optical signals at different wavelengths to form a combined optical signal in the optical slab having an aggregate power. The apparatus can further comprise a broadcaster to distribute the combined optical signal from the optical slab to each of a plurality of different optical receivers with a fraction of the aggregate power of the combined optical signal.

12 Claims, 9 Drawing Sheets

(51) Int. Cl.
*G02B 6/43* (2006.01)
*H04J 14/02* (2006.01)
*H04B 10/60* (2013.01)
*G02B 6/42* (2006.01)

(52) U.S. Cl.
CPC ............ *G02B 6/29311* (2013.01); *G02B 6/43* (2013.01); *H04B 10/60* (2013.01); *H04J 14/02* (2013.01); *G02B 6/4214* (2013.01); *G02B 6/4215* (2013.01)

(58) Field of Classification Search
CPC ...... G02B 6/4215; G02B 6/4249; G02B 6/43; G02B 6/12004; G02B 6/29367; G02B 6/2938; G02B 6/32; G02B 6/4204; G02B 6/423; G02B 6/4232; G02B 6/425; G02B 6/4269; G02B 6/428; H04B 10/60; H04J 14/02; H04J 14/0278
USPC ... 385/14, 24, 27–28, 31, 37, 39, 49, 51–52, 385/122–123, 129–130, 46, 47, 146
See application file for complete search history.

(56) References Cited

U.S. PATENT DOCUMENTS

| | | |
|---|---|---|
| 5,894,535 A | 4/1999 | Lemoff et al. |
| 6,236,778 B1 | 5/2001 | Laughlin |
| 6,332,050 B1 * | 12/2001 | Feldman ............ G02B 6/2817 385/1 |
| 6,768,834 B1 * | 7/2004 | Gruhlke ............ G02B 3/0031 385/129 |
| 7,184,621 B1 | 2/2007 | Zhu |
| 8,036,533 B2 | 10/2011 | Hosomi et al. |
| 2002/0021855 A1 | 2/2002 | Kim |
| 2002/0191900 A1 | 12/2002 | Hoffmann et al. |
| 2003/0099018 A1 * | 5/2003 | Singh .................... B82Y 20/00 398/82 |
| 2004/0175069 A1 | 9/2004 | Zami |
| 2005/0018951 A1 | 1/2005 | Mossberg et al. |
| 2007/0160321 A1 | 7/2007 | Wu et al. |
| 2007/0230871 A1 | 10/2007 | Bidnyk et al. |
| 2008/0089684 A1 | 4/2008 | Smith et al. |
| 2008/0193134 A1 | 8/2008 | Ranalli |
| 2008/0198570 A1 | 8/2008 | Hatanaka et al. |
| 2009/0002928 A1 * | 1/2009 | Murakami ........ G02F 1/133308 |
| 2012/0093462 A1 * | 4/2012 | Childers ............ G02B 6/3831 385/33 |

OTHER PUBLICATIONS

Schow, C.L. et al., A Single-chip CMOS-based Parallel Optical Transceiver Capable of 240-Gb/s Bidirectional Data Rates, (Research Paper), Apr. 1, 2009, Journal of Lightwave Technology, vol. 27, No. 7, pp. 915-929.

Extended European Search Report received in EP Application No. 12875430.6, dated Dec. 21, 2015, 10 pages.

* cited by examiner

OPTICAL SLAB

BACKGROUND

In optic communications, wavelength-division multiplexing (WDM) is a technology which multiplexes a number of optical carrier signals onto a single optical signal by using different wavelengths (e.g., colors) of laser light. This technique enables multiplication of capacity and in some instances, reduced cost.

DETAILED DESCRIPTION

Figure 1:
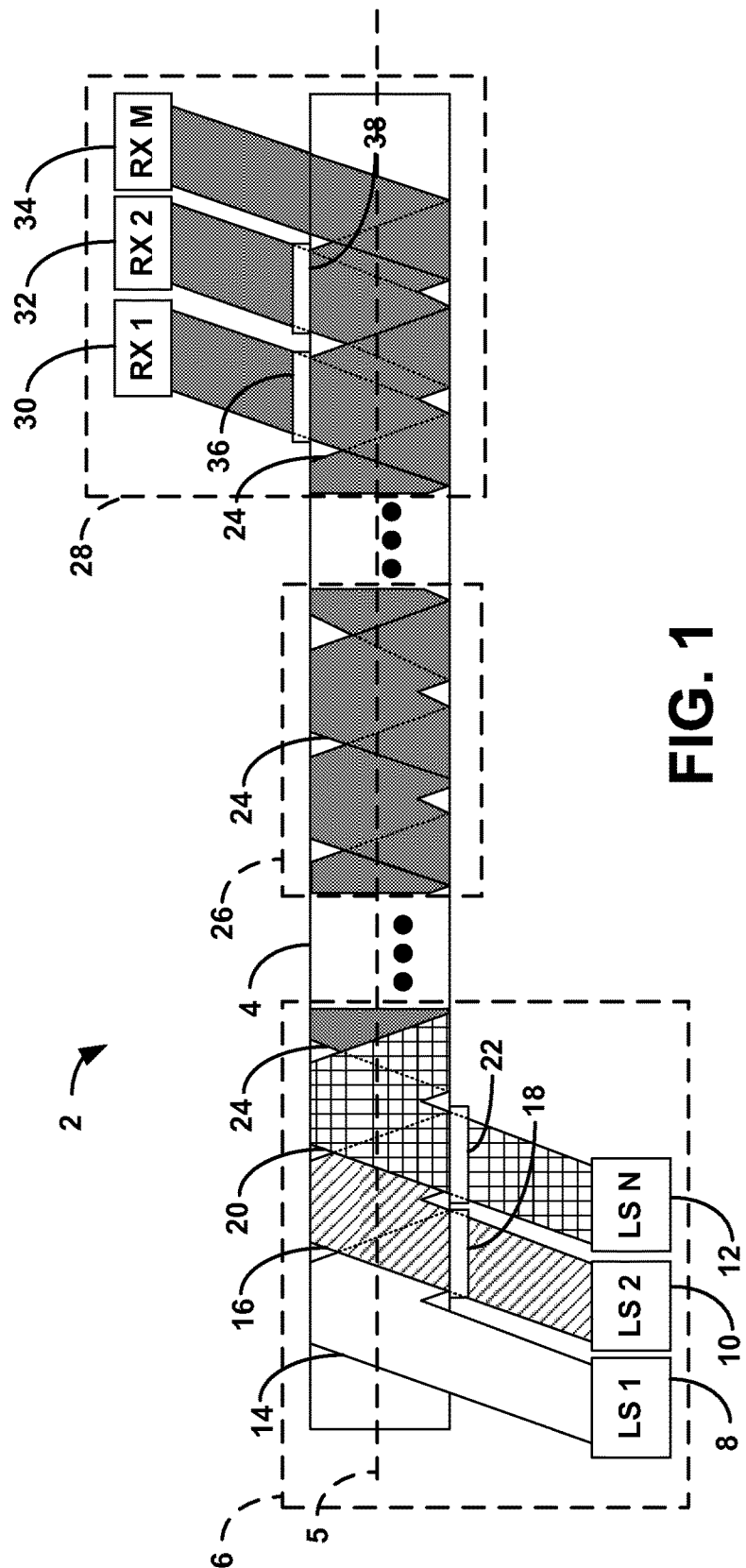
FIG. 1 illustrates an example of an optical engine that combines wave division multiplexing (WDM) with broadcast communication.

FIG. 1 illustrates an example of an optical engine 2 that combines wave division multiplexing with broadcast communication. The optical engine 2 could be employed, for example, in a switch of a data center. In some examples, the optical engine 2 could be employed to facilitate communication between server blades that are mounted on a common rack. The optical engine 2 can include an optical slab 4. The optical slab 4 could be implemented, for example, as a rigid substrate of an optically transmissive material. The optical slab 4 can have a rectangular cross-sectional shape, such as a rectangular prism. The optical slab 4 could be formed, for example, out of glass, plastic or another transmissive and/or transparent material. The optical slab 4 can be coated with a reflective coating, such as a dielectric material or a metal. As discussed herein, specific regions of the optical slab 4 can be free of the reflective material to provide for optical transparency to light.

The optical engine 2 can include a WDM multiplexer 6 that can implement wave division multiplexing (WDM) techniques. The WDM multiplexer 6 multiplexes N number of optical signals onto the optical slab 4 by employing different wavelengths (e.g., different colors) of laser light, where N is an integer greater than one (e.g., 2 or more e.g., up to about 8). The WDM multiplexer 6 can implement for example, coarse wave division multiplexing (CWDM) such as providing a channel spacing between different wavelengths light or about 10 nm or greater.

The WDM multiplexer 6 can receive an optical signal from N number of light sources 8, 10 and 12. Each light source 8, 10 and 12 can include, for example a laser and an optical element (e.g., a lens, a grating or the like). The laser could be implemented, for example, as a vertical-cavity surface-emitting laser (VCSEL). A VCSEL is a type of semiconductor laser diode with laser beam of emission perpendicular from a top surface. Each light source 8, 10 and 12 can provide an optical signal at a specific wavelength. In some examples, each light source 8, 10 and 12 can provide an optical signal with a wavelength between about 800 nm to about 1100 nm. Moreover, each light source 8, 10 and 12 can have a channel spacing of at least 10 nm between adjacent wavelengths.

A first light source 8 can emit a first optical signal 14 into a region of the optical slab 4 that is not coated by the reflective coating. The first optical signal 14 can be transmitted into the optical slab 4 at an acute angle (e.g., about 6° to about 8°), which angle can be referred to as an input angle. It is noted that the thickness of the optical slab 4 can be selected based on the input angle. A second light source 10 can emit a second optical signal 16 that has a wavelength separated from the first optical signal 14 by the channel spacing. The second optical signal 16 can be transmitted into a region of the optical slab 4 that is not coated with the reflective material, but instead is covered with a WDM filter 18 (which can also be referred to as an input filter) associated with the second optical signal 16, such as a dielectric interference filter, a notch filter or the like. The WDM filter 18 associated with the second optical signal 16 transmits light at a wavelength of the second optical signal 16 and reflects other wavelengths. Thus, the WDM filter 18 can be fabricated and positioned on the optical slab 4 to transmit the second optical signal 16 into the optical slab 4 at the input angle and to reflect the first optical signal 14, such that the first and second optical signals 14 and 16 are propagated through the optical slab 4 along an axis 5 of the slab 4. The Nth light source 12 can emit an Nth optical signal 20 that has a wavelength separated from a preceding optical signal (e.g., optical signal N−1) by the channel spacing. The Nth optical signal 20 can be transmitted to a WDM filter 22 associated with the Nth optical signal 20. The WDM filter 22 associated with the Nth optical signal 20 can be similar to the WDM filter 22 associated with the second optical signal 16. That is, the WDM filter 22 associated with the Nth optical signal 20 transmits signals with a wavelength of the Nth optical signal 20 while reflecting other signals (e.g., including the first to N−1 optical signals). Thus, the WDM filter 22 associated with the Nth optical signal 20 can be fabricated and positioned on the optical slab 4 to transmit the Nth optical signal 20 into the optical slab 4 at the input angle and to reflect the first to N−1 optical signals 14, 16 and 20, such that the first to Nth optical signals 14, 16 and 20 are propagated through the optical slab 4. The first to Nth optical signals 14, 16 and 20 can be propagated as a combined optical signal 24 through the optical slab 4 with a zigzag beam shape within the transmissive medium of the optical slab 4.

A propagation region 26 of the optical slab 4 can carry the combined optical signal 24 from the WDM multiplexer 6 to a broadcaster 28 of the optical engine 2 while maintaining the zigzag beam shape for the combined optical signal 24. In one example, the WDM multiplexer 6 can be positioned at one end of the optical slab 4, and the broadcaster 28 can be positioned at an opposing end of the optical slab 4 that is spaced axially (along the axis 5 of the slab 4) apart from the WDM multiplexer 6. In other examples, different arrangements can be employed.

The broadcaster 28 can receive the combined optical signal 24 and distribute the combined optical signal 24 to each of M number of receivers 30, 32 and 34, where M is an integer greater than one (e.g., 2-10). In some examples, the broadcaster 28 of the optical engine 2 can be fabricated such that the combined optical signal is received at a first broadcast filter 36 (which can also be referred to as an output filter) at an output angle, which output angle can be substantially equal to the input angle. The first broadcast filter 36 could be implemented as a dielectric material or a metallic partial reflector, a grating or the like. The first broadcast filter 36 can be configured to transmit the combined optical signal 24 with a fraction of its total aggregate power to a corresponding first receiver 30 of the M number of receivers 30, 32 and 34 and reflect the remaining fraction of power of the combined optical signal 24. The first broadcast filter 36 can be a broadband filter, such as a filter that uniformly operates on at least all of the wavelengths within the combined optical signal 24. In a similar fashion, the fraction of the remaining combined optical signal 24 can be received by a second broadcast filter 38. The second broadcast filter 38 can be configured to transmit another fraction of power of the combined optical signal 24 to a corresponding second receiver 32 of the M number of receivers 30, 32 and 34 and reflect the remaining fraction of power of the combined optical signal 24. The third to M−1 broadcast filters (not shown) can be fabricated and positioned on the optical slab 4 in a similar manner. It is noted that no Mth broadcast filter is needed in some examples. Instead, in some examples, the fraction of power of the combined optical signal 24 remaining after the M−1 broadcast filter can be transmitted from the optical slab 4 to a corresponding Mth receiver 34 of the M number of receivers 30, 32 and 34 at a region of the optical slab 4 that is not covered by the reflective coating. Each of the filters can be configured to control the fractional portion of power that is transmitted to each of the receivers 30, 32 and 34, which can vary depending on the total available power and the number of receivers.

By way of example, the fraction of power of the combined optical receiver received at each of the M number of receivers can be relatively equal. For instance, in one example, the fraction of power of the combined optical signal 24 reflected by the first to M−1 broadcast filters 36 and 38 (broadcast filter X) can be determined from Equation 1:

$$r_x = \frac{M - X}{M + 1 - X} \qquad \text{Equation 1}$$

where:

$r_x$ is the fraction (or ratio) of power of the combined optical signal 24 reflected to the Xth receiver by the Xth broadcast filter; and M is the total number of receivers.

Each of the M number of receivers 30, 32 and 34 can be implemented for example, as an interface between mediums. For instance, in some examples, each of the receivers 30, 32 and 34 can include an optical element (e.g., a collimating lens) and a fiber-optic cable such that the combined optical signal 24 received thereby can be transmitted along the fiber-optic cable. In other examples, each of the receivers 30, 32 and 34 can include a photodiode that can convert the combined optical signal 24 into a corresponding electrical signal, which can be employed as an input to a network port.

In one example, the optical slab 4 along with the WDM filters 18 and 22 and the broadcast filters 36 and 38 can be fabricated from a stack of wafers. Thus, different thicknesses of the stack can adjust the transmission frequency of the WDM filters 18 and 22 and/or the fraction of the power of the combined optical signal 24 transmitted by the broadcast filters 36 and 38. Thus, in some examples, WDM filters 18 and 22 and the broadcast filters 36 and 38 can be etched from the stack of wafers. In other examples, the optical slab 4, the WDM filters 18 and 22 and the broadcast filters 36 and 38 can be fabricated separately. In such a situation, the WDM filters 18 and 22 and the broadcast filters 36 and 38 can be positioned and adhered to the optical slab 4 (e.g., by an optical adhesive having an appropriate index of refraction).

By combining the WDM multiplexer 6 and the broadcaster 28 onto the same optical slab 4, a high bandwidth (e.g., about 40 gigabits per second) optical engine 2 can be achieved. Additionally, since a zigzag beam shape is maintained throughout the body of the optical slab 4 through the reflective coating and relay design, the optical engine 2 has a very low loss.

Figure 2:
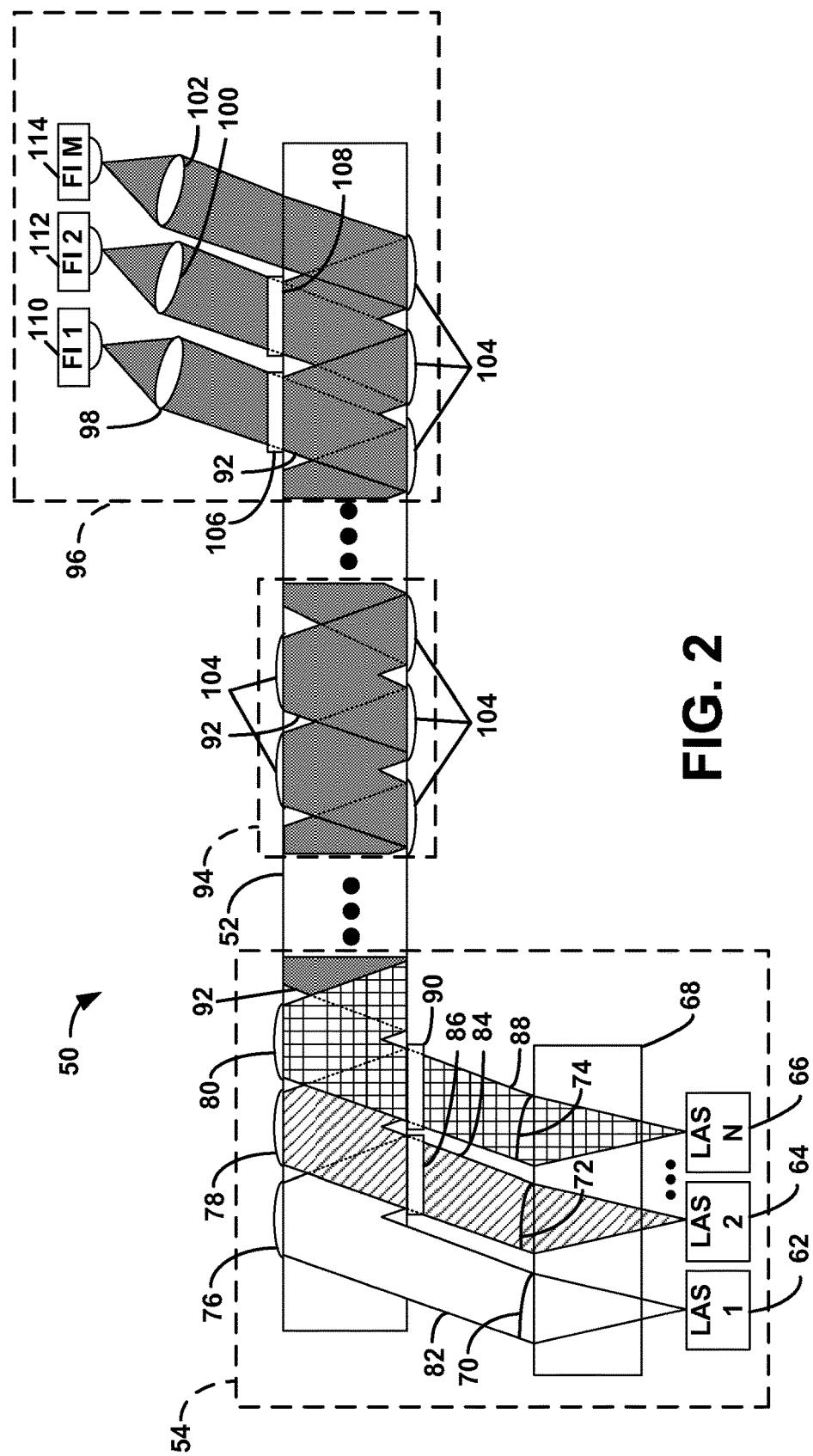
FIG. 2 illustrates another example of an optical engine that combines WDM with broadcast communication.

FIG. 2 illustrates an example of the optical engine 50 that could be employed as the optical engine 2 illustrated in FIG. 1. The optical engine 50 can include an optical slab 52. The optical slab 52 could be implemented, for example as a rigid substrate of an optically transmissive material (e.g., a slab). The optical slab 52 can be coated with the reflective coating, such as a dielectric material for a metal. As discussed herein, specific regions of the optical slab 52 can be free of such reflective material.

The optical engine 50 can include a WDM multiplexer 54. The WDM multiplexer 54 employs WDM to multiplex N number of optical signals onto the optical slab 52 by employing different wavelengths (e.g., different colors) of laser light. The WDM multiplexer 54 can receive an optical signal from N number of light emitting devices 62, 64 and 66. Each light emitting device 62, 64 and 66 can be implemented, for example by a laser. The laser could be implemented, for example, as a VCSEL. In some examples, each light emitting device 62, 64 and 66 can provide an optical signal with a wavelength between about 800 nm to about 1100 nm. Moreover, each light emitting device 62, 64 and 66 can have a channel spacing of at least 10 nm. Each light emitting device 62, 64 and 66 can provide an optical signal at a specific wavelength to a lens block 68. The lens block 68 can be formed, for example from a transmissive and/or transparent material, such as glass, plastic or the like. The lens block 68 can include N number of half lenses 70, 72 and 74 mounted thereon for redirecting light. Additionally, the optical slab 52 can include N number of beam shaping mirrors 76, 78 and 80 mounted thereon to further shape and direct light beams to propagate in the optical slab 52 in a zigzag manner. The beam shaping mirrors 76, 78 and 80 could be implemented, for example, as curved mirrors.

A first light emitting device 62 can emit a first optical signal 82 into the lens block 68. The lens block 68 can transmit the first optical signal 82 to a first half lens 70 of the N number of half lenses 70, 72 and 74. The first half lens 70 can redirect the first optical signal 82 at an input angle (e.g., about 6° to about 8°) and toward a region of the optical slab 52 that is not coated by the reflective coating. The first optical signal 82 can be transmitted into the optical slab 52 at an acute angle (e.g., about 6° to about 8°), which angle can be referred to as an input angle. The first optical signal 82 can be reflected by a first of the N number of beam shaping mirrors 76 mounted on the optical slab 52.

A second light emitting device 64 can emit a second optical signal 84 that has a wavelength separated from the first optical signal 82 by the channel spacing. The second optical signal 84 can be transmitted through the lens block 68 and into a second half lens 72 of the N number of half lenses 70, 72 and 74. The second half lens 72 can redirect the second optical signal 84 in a manner similar to the first half lens 70 and direct the second optical signal 84 into a region of the optical slab 52 that is not coated with the reflective material, but instead is covered with a WDM filter 86 associated with the second optical signal 84. The WDM filter 86 associated with the second optical signal 84 transmits light at a wavelength of the second optical signal 84 and reflects other wavelengths. Thus, the WDM filter 86 can be fabricated and positioned on the optical slab 52 to transmit the second optical signal 84 into the optical slab 52 at the input angle and to reflect the first optical signal 82, such that the first and second optical signals 82 and 84 are propagated through the optical slab 52. The second optical signal 82 can be combined with the first optical signal 82 and propagated through the optical slab 52 to reflect off a second beam shaping mirror 78 of the N number of beam shaping mirrors 76, 78 and 80.

The Nth light emitting device 66 can emit an Nth optical signal 88 that has a wavelength separated from a preceding optical signal (e.g., optical signal N-1) by the channel spacing. The Nth optical signal 88 can be transmitted through the lens block 68 and redirected to the input angle by an Nth half lens 74 of the N number of half lenses 70, 72 and 74 and transmitted toward a WDM filter 90 associated with the Nth optical signal 88. The WDM filter 90 associated with the Nth optical signal 88 can be similar to the WDM filter 86 associated with the second optical signal 84. That is, the WDM filter 90 associated with the Nth optical signal 88 transmits signals with a wavelength of the Nth optical signal 88 while reflecting other signals (e.g., including the first to N-1 optical signals). Thus, the WDM filter 90 associated with the Nth optical signal 88 can be fabricated and positioned on the optical slab 52 to transmit the Nth optical signal 88 into the optical slab 52 at the input angle and to reflect the first to N-1 optical signals 82 and 84, such that the first to Nth optical signals 82, 84 and 88 are propagated through the optical slab 52. The first to Nth optical signals 82, 84 and 88 can be propagated as a combined optical signal 92 through the optical slab 52 with a zigzag beam shape.

A propagation region 94 of the optical slab 52 can carry the combined optical signal 92 from the WDM multiplexer 54 to a broadcaster 96 of the optical engine 50 while maintaining the zigzag beam shape for the combined optical signal 92. The broadcaster 96 can receive the combined optical signal 92 and distribute the combined optical signal 92 to M number of collimating lenses 98, 100 and 102, where M is an integer greater than one (e.g., 2-10). In some examples, the broadcaster 96 and the propagation region 94 of the optical slab 52 can include relay lenses 104 positioned through the optical slab 52 to reduce divergence-induced loss. The relay lenses 104 can be broadband lenses that reflect light beams at a relay angle, which relay angle can be substantially equal to the input angle.

The broadcaster 96 of the optical engine 50 can be fabricated such that the combined optical signal 92 is received at a first broadcast filter 106 at an output angle, which output angle can be substantially equal to the input angle. The first broadcast filter 106 could be implemented as a dielectric or a metallic partial reflector, a grating or the like. The first broadcast filter 106 can be configured to transmit a fraction of power of the combined optical signal 92 to a corresponding first collimating lens 98 of the M number of collimating lenses 98, 100 and 102 and reflect the remaining fraction of power of the combined optical signal 92. The first broadcast filter 106 can be a broadband filter. In a similar fashion, the fraction of the remaining combined optical signal 92 can be received by a second broadcast filter 108. The second broadcast filter 108 can be configured to transmit another fraction of power of the combined optical signal 92 to a corresponding second collimating lens 100 of the M number of collimating lenses 98, 100 and 102 and reflect the remaining fraction of power of the combined optical signal 92. The third to M-1 broadcast filters (not shown) can be fabricated and positioned on the optical slab 52 in a similar manner. It is noted that no Mth broadcast filter is needed in some examples. Instead, in some examples, the fraction of power of the combined optical signal 92 remaining after the M-1 broadcast filter can be transmitted from the optical slab 52 to a corresponding Mth collimating lens 102 of the M number of collimating lenses 98, 100 and 102 at a region of the optical slab 52 that is not covered by the reflective coating. In one example, the fraction of power of the combined optical signal 92 reflected by the first to M-1 broadcast filters 106 and 108 (broadcast filter X) can be determined from Equation 1.

Each of the M number of collimating lenses 98, 100 and 102 can couple light to a corresponding fiber-optic cable 110, 112 and 114. In some examples, the fiber-optic cables 110, 112 and 114 can be coupled to an input port of a network interface card for conversion to electrical signals.

Figure 3:
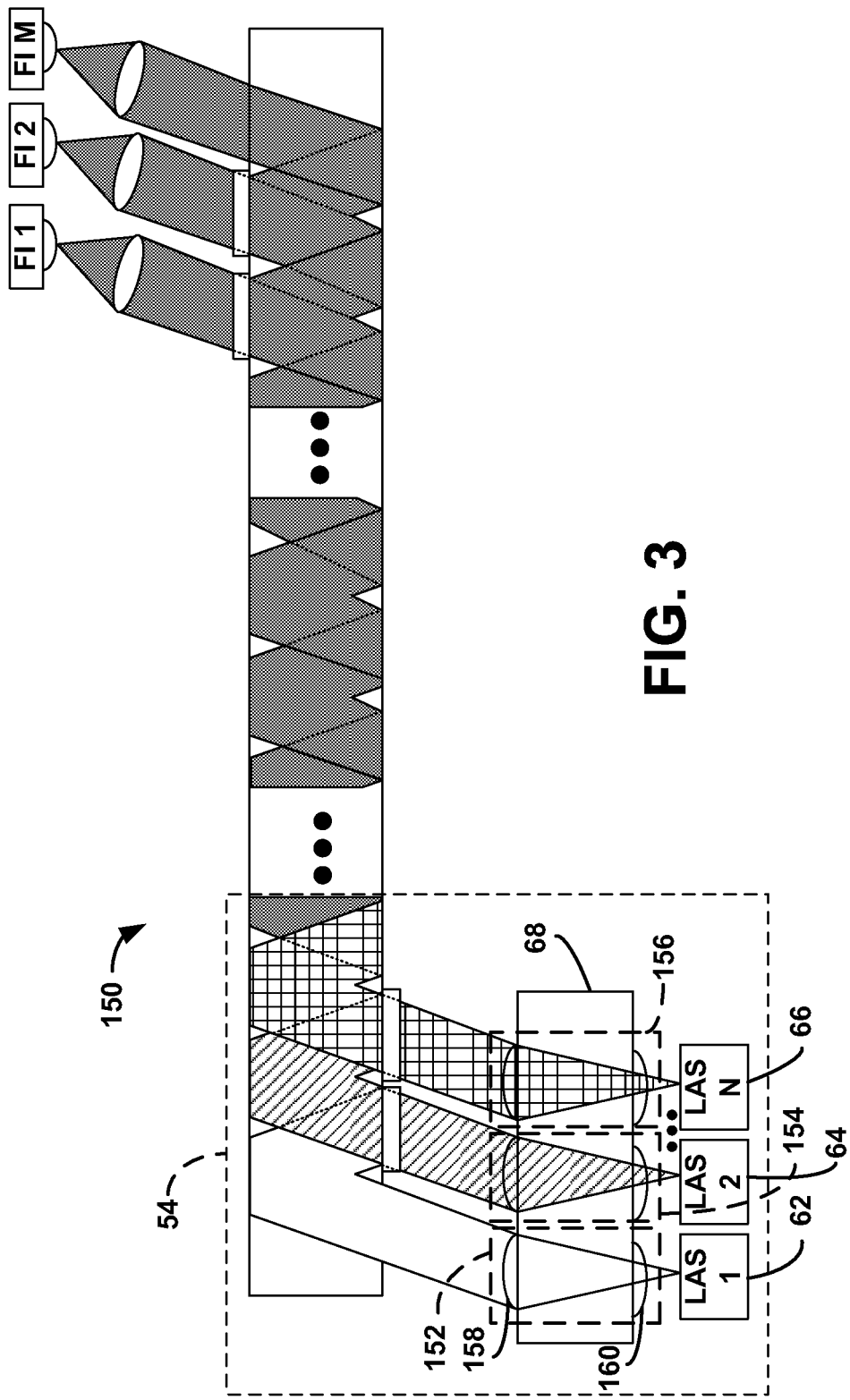
FIG. 3 illustrates yet another example of an optical engine that combines WDM with broadcast communication.

FIG. 3 illustrates another example of an optical engine 150 that could be employed as the optical engine 2 illustrated in FIG. 1. The optical engine 150 of FIG. 3 is similar to the optical engine 50 of FIG. 2 except instead of the half lenses 70, 72 and 74 illustrated in the example of FIG. 2, the WDM multiplexer 54 illustrated in FIG. 3 includes a pair of lenses 152, 154 and 156 mounted on the lens block 68 for each optical signal transmitted from first to N light emitting devices 62, 64 and 66. For purposes of simplification of explanation, FIGS. 2 and 3 employ the same reference numbers to indicate the same structures. Each pair of lenses 152, 154 and 156 can collimate and angle light beams to an input angle transmitted from a corresponding light emitting device 62, 64 and 66. An upper lens 158 and a lower lens 160 for a given pair of lenses 152, 154 and 156 can mounted on opposing sides of the lens block 68. Moreover, the input angle can be varied based on an offset of the upper lens 158 and the lower lens 160 for a given pair of lenses 152, 154 and 156.

Figure 4:
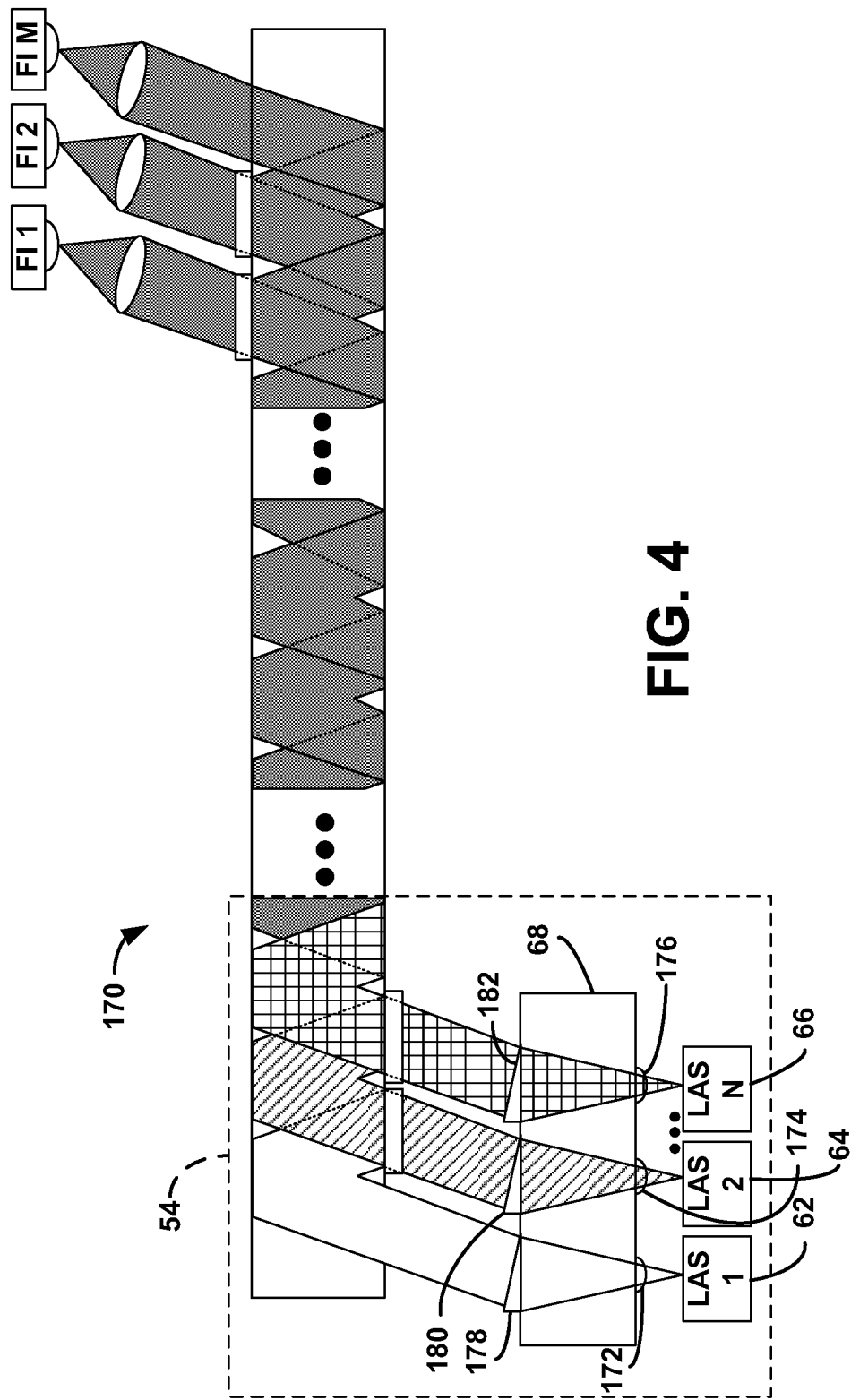
FIG. 4 illustrates a further example of an optical engine that combines WDM with broadcast communication.

FIG. 4 illustrates another example of an optical engine 170 that could be employed as the optical engine 2 illustrated in FIG. 1. The optical engine 150 of FIG. 4 is similar to the optical engine 50 of FIG. 2 except instead of the half lenses 70, 72 and 74 illustrated in the example of FIG. 2, the WDM multiplexer 54 illustrated in FIG. 4 includes collimating lenses 172, 174 and 176 mounted on a given side of the lens block 68 and prisms 178, 180 and 182 mounted on an opposing side of the lens block 68. For purposes of simplification of explanation, FIGS. 2 and 4 employ the same reference numbers to indicate the same structures. Each collimating lens 172, 174 and 176 can collimate light beams provided from a corresponding light emitting device 62, 64 and 66. Each collimating lens 172, 174 and 176 can be centered about a light beam emitted from the corresponding light emitting device 62, 64 and 66. Light transmitted from the collimating lens 172, 174 and 176 can be received by a corresponding prism 178, 180 and 182 that can tilt the collimated light to an input angle. Each of the prisms 178, 180 and 182 could be implemented, for example, as triangular prisms. Moreover, the input angle can be varied based on the dimensions of the prisms 178, 180 and 182.

Figure 5:
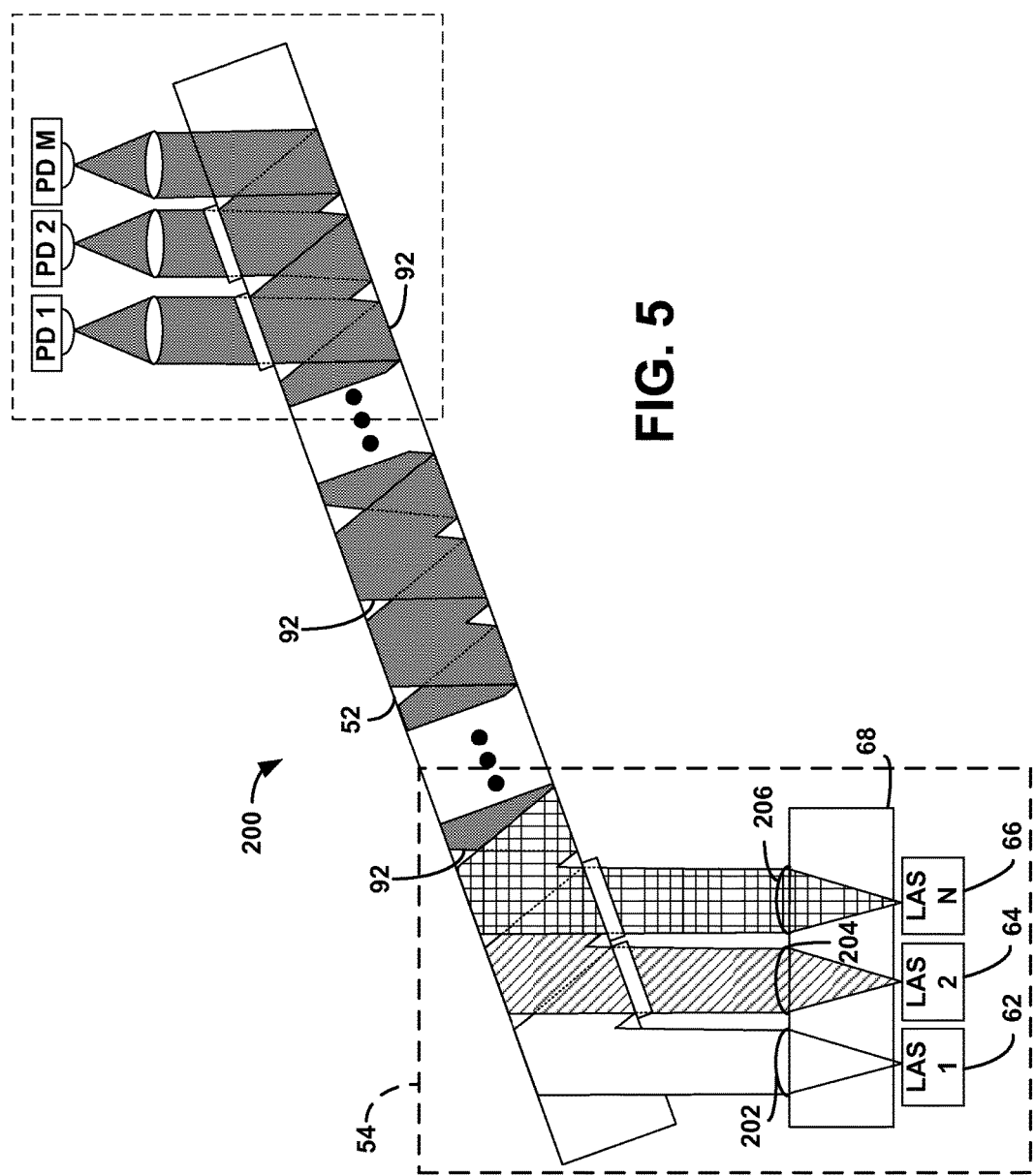
FIG. 5 illustrates still yet another example of an optical engine that combines WDM with broadcast communication.

FIG. 5 illustrates yet another example of an optical engine 200 that could be employed as the optical engine illustrated in FIG. 1. The optical engine 200 of FIG. 4 is similar to the optical engine of FIG. 2 except instead of the half lenses 70, 72 and 74 illustrated in the example of FIG. 2, the WDM multiplexer 54 illustrated in FIG. 5 includes a collimating lens 202, 204 and 206 mounted on the lens block 68 for each optical signal transmitted from the first to Nth light emitting devices 62, 64 and 66. For purposes of simplification of explanation, FIGS. 2 and 5 employ the same reference numbers to indicate the same structures. Each collimating lens 202, 204 and 206 can transmit light beam in a direction normal to the lens block 68. Each of the collimating lenses 202, 204 and 206 could be implemented, for example, as a micro-lens. Moreover, the optical slab 52 can be offset by an input angle (e.g., about 6° to about 8°) relative to the lens block 68 to ensure proper propagation of light beams through the optical slab. In a similar manner, fractions of the combined optical signal 92 can exit the optical slab 52 in a direction normal to the lens block 68.

Figure 6:
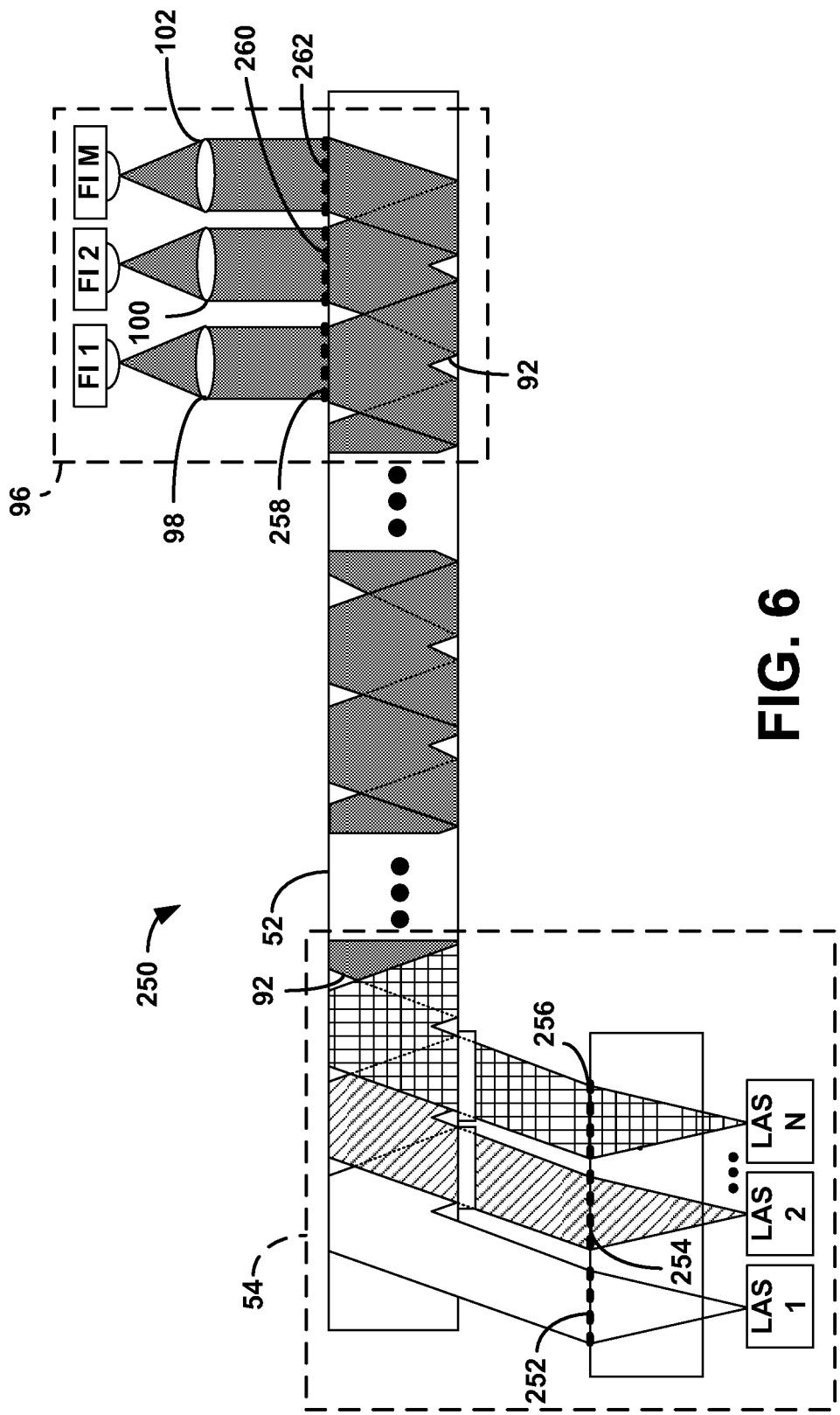
FIG. 6 illustrates yet still another example of an optical engine that combines WDM with broadcast communication.

FIG. 6 illustrates yet another example of an optical engine 250 that could be employed as the optical engine 2 illustrated in the example of FIG. 1. The optical engine 250 of FIG. 6 is similar to the optical engine 50 of FIG. 2 except that instead of the half lenses 70, 72 and 74 and broadcast filters 106 and 108 illustrated in FIG. 2, the WDM multiplexer 54 illustrated in FIG. 6 includes N number of WDM gratings 252, 254 and 256 overlaying the lens block 68. The WDM gratings 252, 254 and 256 can be implemented, for example, as a high contrast gratings, such as gratings with an index of refraction of about 3 or more (e.g., at least about 3.5). For purposes of simplification of explanation, FIGS. 2 and 6 employ the same reference numbers to indicate the same structures. Each of the WDM gratings 252, 254 and 256 can split, collimate and redirect light output by a corresponding light source. Additionally, M number of broadcast gratings 258, 260 and 262 can be employed by the broadcaster 96 to distribute the combined optical signal 92 to M number of collimating lenses 98, 100 and 102. Each of the broadcast gratings 258, 260 and 262 can split and redirect the combined optical signal 92 signal to a corresponding collimating lens 98, 100 or 102. The broadcast gratings 252, 254 and 256 can be implemented as high contrast gratings, such as gratings with an index of refraction of about 3 or more (e.g., at least about 3.5). In some examples, the broadcast gratings 258, 260 and 262 can output the combined optical signal 92 in a direction normal to a face of the optical slab 52. Each of the input and broadcast gratings 252, 254, 256, 258, 260 and 262 can be formed from a dielectric material. Moreover, employment of the WDM and/or broadcast gratings 252, 254, 256, 258, 260 and 262 provide significant control of the input and output angles.

Figure 7:
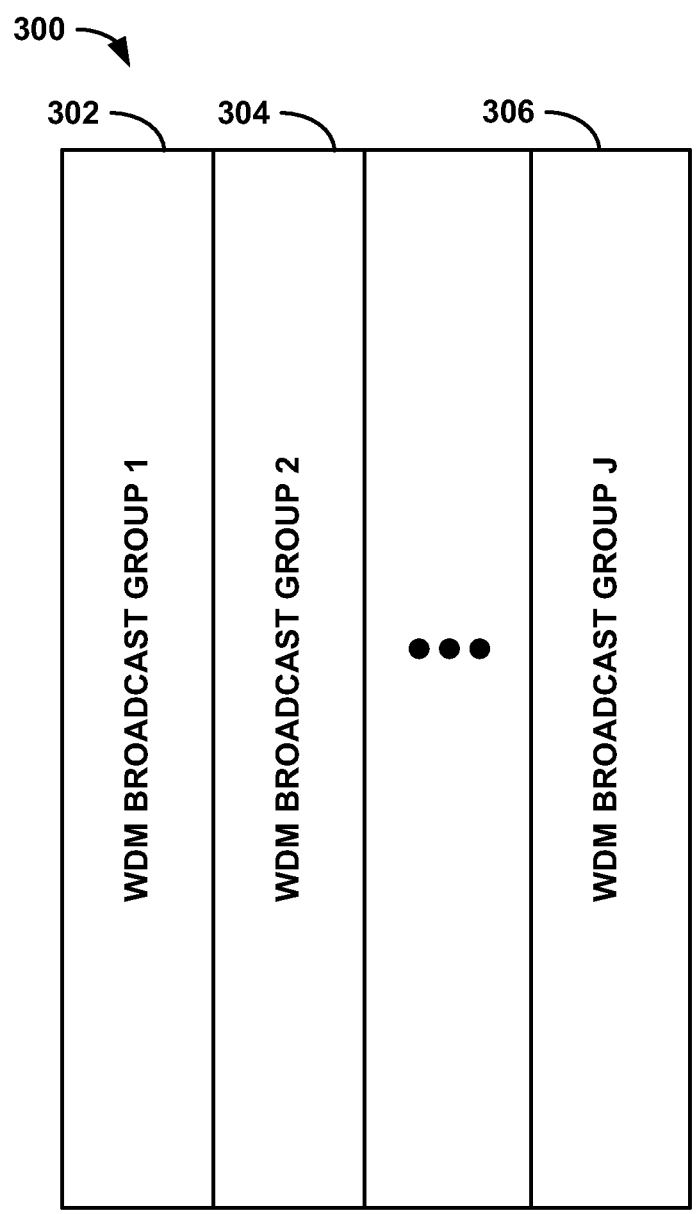
FIG. 7 illustrates an array of WDM-broadcasting groups.

FIG. 7 illustrates an example of an optical engine 300 with J number of WDM-broadcast groups 302, 304 and 306, where J is an integer greater than one. Each of the J number of WDM-broadcast groups 302, 304 and 306 could be implemented in a manner similar to the optical engines 2, 50, 150, 200 and 250 illustrated in FIGS. 1-5. Moreover, each of the J number of WDM-broadcast groups 302, 304 and 306 can be mounted on a common optical slab that can be implemented as a rigid slab. Each of the J number of WDM-broadcast groups 302, 304 and 306 can be separated by a distance of about 250 µm or more. In this manner, combined optical signals propagated by each of the J groups of WDM-broadcast groups 302, 304 and 306 can propagate through the common optical slab with substantially parallel paths. By employment of the optical engine 300, significant space savings can be achieved.

Figure 8:
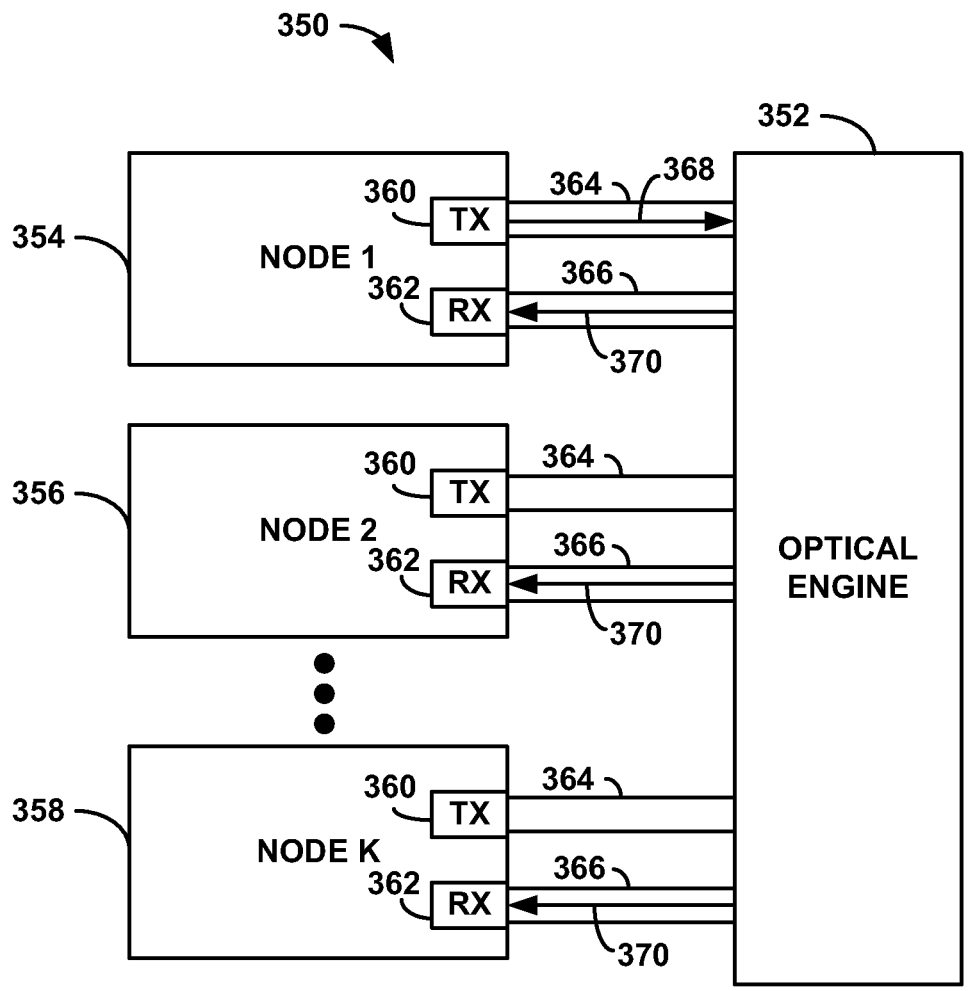
FIG. 8 illustrates an example of a system that employs an optical engine.

FIG. 8 illustrates an example of a system 350 that could employ an optical engine 352, such as the optical engine 2, 50, 150, 200, 250 and 300 illustrated in FIGS. 1-6. The system 350 could be implemented, for example, in a data center rack. The system 350 includes K number of nodes 354, 356 and 358, wherein K is an integer greater than two. Each of the K number of nodes 354, 356 and 358 could represent, for example, a blade server computer. Each of the K number of nodes 354, 356 and 358 can include a transmitter 360 and a receiver 362. In some examples, each receiver 362 can be representative of at least K−1 number of receivers. Each transmitter 360 and receiver 362 can be implemented as fiber-optic ports. Additionally, each transmitter 360 and receiver 362 can communicate on a corresponding input and output fiber-optic cables 364 and 366. It is noted that while input and output fiber-optic cables 364 and 366 are illustrated as being separate cables, in other examples, the input and output fiber-optic cables 364 and 366 could be integrated into a single cable.

The first node 354 of the N number of nodes 354, 356 and 358 can transmit an input optical signal 368 that could be comprised of a plurality of optical signals, such as the first through Nth optical signals 14, 16 and 20 illustrated in FIG. 1. The optical engine 352 can combine the plurality of optical signals that comprise the input signal to form a combined optical signal 370. The optical engine 352 can broadcast a fraction of the combined optical signal 370 to each of the K number of nodes 354, 356 and 356. In this manner, a high speed, low loss communication between the K number of nodes 354, 356 and 358 can be implemented.

Figure 9:
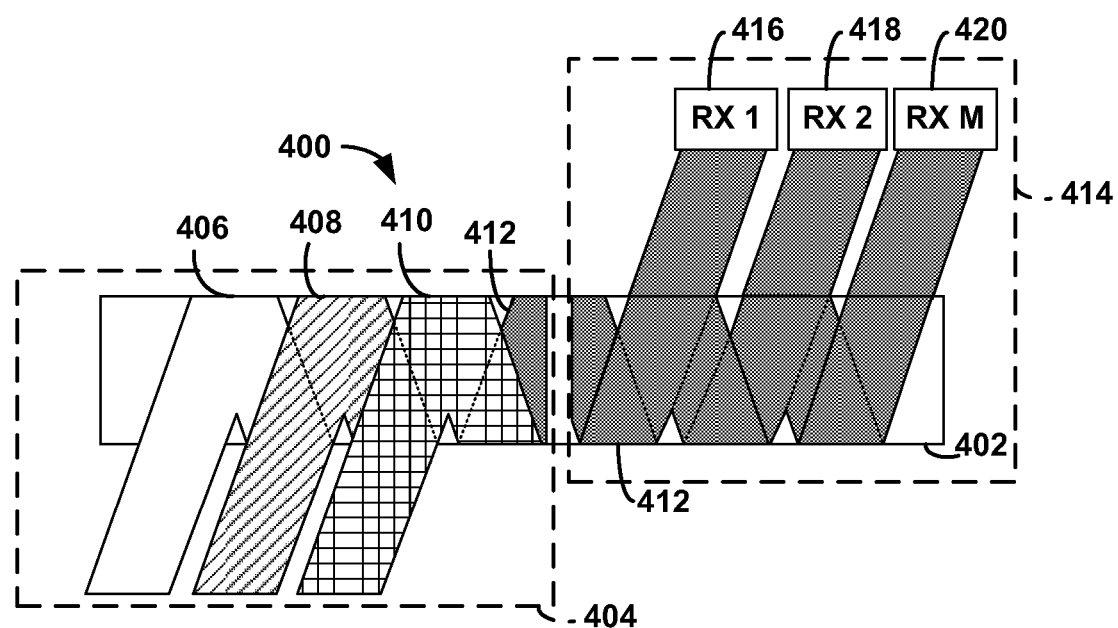
FIG. 9 illustrates another example of an optical engine.

FIG. 9 illustrates an example of an optical engine 400. The optical engine 400 can comprise an optical slab 402 comprising a rigid substrate of substantially transmissive material. The optical engine 400 can also comprise a WDM multiplexer 404 to receive and combine a plurality of optical signals 406, 408 and 410 at different wavelengths to form a combined optical signal 412 in the optical slab 402 having an aggregate power. The optical engine 400 can further comprise a broadcaster 414 to distribute a fraction of the combined optical signal 412 from the optical slab 402 to a plurality of different optical receivers 416, 418 and 420 with a fraction of the aggregate power of the combined optical signal 412.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. An apparatus comprising:
an optical slab comprising a rigid substrate of substantially transmissive material;
a wave division multiplexing (WDM) multiplexer, on the optical slab, to receive and combine a plurality of optical signals at different wavelengths to form a combined optical signal in the optical slab having an aggregate power; and
a broadcaster, on the optical slab, to distribute the combined optical signal from the optical slab to each of a plurality of different optical receivers with a fraction of the aggregate power of the combined optical signal,
wherein a portion of the optical slab is coated with reflective material to maintain the optical signals in substantially parallel paths in a zigzag beam shape through the optical slab from the WDM multiplexer to the broadcaster.

2. The apparatus of claim 1, wherein each of the plurality of optical signals are separated by a wavelength of at least 10 nanometers.

3. The apparatus of claim 1, further comprising a plurality of WDM filters mounted on the optical slab, each of the plurality of WDM filters to transmit light at a given wavelength therethrough and to reflect light at a wavelength other than the given wavelength into the optical slab.

4. The apparatus of claim 1, further comprising a plurality of broadcast filters mounted on the optical slab, each broadcast filter to transmit the fraction of power of the combined optical signal and to reflect a remaining portion of power of the combined optical signal.

5. The apparatus of claim 1, wherein the combined optical signal is to propagate through the optical slab at an angle of about 6° to about 8° relative to an interior sidewall of the optical slab.

6. The apparatus of claim 1, wherein the WDM multiplexer further comprises a lens block to receive the plurality of optical signals at a given side and to transmit the plurality of optical signals at another side that opposes the given side.

7. The apparatus of claim 6, further comprising a plurality of half-lenses mounted on the lens block to redirect optical signals in a given direction to an input angle into the optical slab.

8. The apparatus of claim 6, further comprising a plurality of pairs of lenses mounted on the lens block, wherein one lens in a given pair of lenses is to collimate an optical signal and another lens in the given pair of lenses is to redirect optical signals in a given direction to an input angle into the optical slab, wherein the one lens is mounted on the given side of the lens block, and the another lens is mounted on the another side of the lens block and is offset axially relative to the given lens.

9. The apparatus of claim 6, further comprising a plurality of micro-lenses mounted on the lens block, each micro-lens to:
collimate a given optical signal of the plurality of optical signals; and
transmit the collimated given optical signal into the optical slab in a direction normal to the given and the another side of the lens block;

wherein the optical slab is offset at an angle relative to the given and the another side of the lens block.

10. The apparatus of claim 6, further comprising:
a given plurality of high contrast gratings mounted on the lens block to direct the plurality of optical signals to the optical slab at an input angle; and
another plurality of high contrast gratings mounted on the optical slab to redirect and distribute the combined optical signal to the plurality of different optical receivers at an angle normal to a side of the optical slab.

11. The apparatus of claim 6, further comprising:
a plurality of collimating lenses mounted on the given side of the lens block; and
a plurality of prisms mounted on the opposing side of the lens block, wherein a given collimating lens of the plurality of collimating lenses is to collimate an optical signal and a corresponding given prism of the plurality of prisms is to tilt an optical signal in a given direction to an input angle into the optical slab.

12. A system comprising:
N number of light sources, each of the N number of light sources transmitting an optical signal at a different wavelength, wherein N is an integer greater than one;
an optical slab comprising a substrate of substantially transmissive material;
a wave division multiplexing (WDM) multiplexer, on the optical slab, to receive and combine each of the optical signals transmitted by the N number of light sources to form a combined optical signal having an aggregate power; and
a broadcaster, on the optical slab, to broadcast the combined optical signal to M number of receivers with a fraction of the aggregate power, wherein M is an integer greater than one,
wherein a portion of the optical slab is coated with a reflective material to maintain the optical signals in parallel in a zigzag beam shape through the optical slab from the WDM multiplexer to the broadcaster, and
wherein each of the M number of receivers comprises:
a collimating lens to collimate a given of the M combined optical signal that is broadcast from the optical slab; and
an optical receiver to receive the combined optical signal from the collimating lens.

* * * * *